United States Patent [19]

Uejima et al.

[11] Patent Number: 5,268,105
[45] Date of Patent: Dec. 7, 1993

[54] METHOD FOR DEHYDRATING HUMAN-WASTE DISPOSAL MATERIALS

[75] Inventors: Hiroyuki Uejima, Nara; Minoru Takewaki, Osaka, both of Japan

[73] Assignees: Kohtoku Industrial Waste Management Incorporation; Daitoh Knit Co., Ltd., both of Japan

[21] Appl. No.: 821,804

[22] Filed: Jan. 17, 1992

[30] Foreign Application Priority Data

Feb. 5, 1991 [JP] Japan .................................. 3-100546

[51] Int. Cl.⁵ ................................................ C02F 1/42
[52] U.S. Cl. ........................................ 210/663; 34/14; 210/751; 210/770
[58] Field of Search ............. 210/663, 689, 749, 751, 210/770, 806, 764, 916; 604/372; 34/14

[56] References Cited

U.S. PATENT DOCUMENTS 3,947,350 3/1976 Cardinal ............................... 210/711
5,149,335 9/1992 Kellenberger et al. ............. 604/372

*Primary Examiner*—Ivars Cintins
*Attorney, Agent, or Firm*—Lorusso & Loud

[57] ABSTRACT

A method for treating used human-waste disposal materials, containing a highly water-absorbent polymer, that have absorbed the water content of human waste. Such used materials are treated with an aqueous solution of an alkaline earth metal salt, such as calcium or magnesium, and then mechanically dehydrated. With this dehydrating method, the water content of used disposable paper diapers can be reduced efficiently and at low cost. This makes the dehydrated human-waste disposal material, such as disposable paper diapers, to be easily disposed of by incineration or other appropriate post-treatment means, or to be used effectively as an organic fertilizer.

10 Claims, No Drawings

METHOD FOR DEHYDRATING HUMAN-WASTE DISPOSAL MATERIALS

TECHNICAL FIELD OF THE INVENTION

This invention relates generally to a method for dehydrating admixtures of human-waste materials including a highly water absorbent polymer that has absorbed the water content of the human waste.

BACKGROUND OF THE INVENTION AND RELATED ART

Highly water-absorbent polymers are widely used in a wide range of applications, particularly as materials for retaining human waste, such as disposable diapers. In existing types of disposable diapers, however, highly water-absorbent polymers are used together with paper and other natural and synthetic fibrous materials, and usually covered with a polyolefin or other synthetic resin film. This makes it difficult to dispose of such materials after use by landfill and other disposal means because of their un-biodegradability. To cope with this, used disposable diapers are, after collection, usually incinerated using incinerators in a high cost operation, without being subjected to any pretreatment, such as dehydration, as reported in a meeting of the Medical Waste Disposal Study Group held on Dec. 1, 1990 (Kenichi Miyashita, "Proper Disposal of Sanitary Materials and Other Solid Wastes—Incinerating Tests of Used Paper Diapers," Summary of Lectures Presented Before the 6th Medical Waste Study Group Seminar, UniCharm, Co., Ltd.)

Incineration of sanitary waste material in the commonly used types of incinerators, however, has frequently caused various problems, such as offensive odor or incomplete combustion in a number of municipal waste incinerating plants, because the high water content of such waste tends to lower the temperature in the incinerator. To reduce such problems, most municipal waste incinerating plants use a large amount of oil and other auxiliary fuels to raise the temperature in the incinerator. This leads not only to increased incinerator cost but also to increased incinerating fuel cost. In addition, the increased volume of disposable diapers due to swelling as a result of water absorption causes incinerating efficiency to lower.

OBJECT OF THE INVENTION

To cope with the above problems, this invention is intended to dehydrate used human-waste disposal materials containing a highly water-absorbent polymer that has absorbed the water content of human waste, particularly used disposable diapers, at low cost and high efficiency so that the water content of such materials can be reduced to facilitate the post-treatment, such as incineration, of the materials, or the effective use of the organic matter in the residual human waste, after dehydrating, as fertilizers.

SUMMARY OF THE INVENTION

This invention provides a method for dehydrating human-waste disposal material, containing a highly water-absorbent polymer that has absorbed the water content of human waste, by treating the material with an aqueous solution of a compound containing an alkaline earth metal salt, and then mechanically dehydrating.

The preferred highly water-absorbent polymers have sodium carboxylate groups, and the preferred aqueous solution of an alkaline earth metal salt is a saturated aqueous solution of calcium chloride or a saturated aqueous solution of magnesium chloride at a temperature higher than 40° C.

The use of the dehydrating method of this invention helps eliminate the problems and costs associated with the incineration of used human-waste disposal materials containing a highly water-absorbent polymer that has absorbed the water content of human waste, and also lends itself to the effective recovery of the residual human waste after dehydrating for use as organic fertilizers.

DETAILED DESCRIPTION OF THE INVENTION

In this invention, the swollen state of used human-waste disposal material containing a highly water-absorbent polymer that has absorbed the water content of human waste is eliminated by treating the used human-waste disposal material with an aqueous solution of a compound containing an alkaline earth metal salt to nullify the bonding strength between the highly water-absorbent polymer and the water.

The reason for deswelling is not known, but it is attributable to the following fact. When considering sodium polyacrylate as the highly water-absorbent polymer, the carboxylate group, as a side chain and the water-absorbent group of the polymer, exists in great numbers on a single high-molecular chain. Since the carboxylate group is almost perfectly ionized as COO—Na+ in the presence of a sodium salt, a large number of COO— groups exist on a single high-molecular chain, imparting high water-absorbency to the high-molecular chain. The presence of COO— groups in relatively close proximity on a single high-molecular chain causes negatively charged ions to repel from each other and to be expanded to a greater extent, compared with the state where no charge exists, thus leading to the swelling of the high-molecular chain. As sodium is ion-exchanged with another alkaline earth metal salt, the high-molecular chain is restored to the state where no charges exist, resulting in reduced water-absorbency, and thereby in deswelling.

Highly water-absorbent polymers used in the human-waste disposal material include sodium salts of ethylene-oxide adducts of polyacrylates, sodium salts of propyleneoxide adducts of polyacrylates, alkaline metals of crosslinked polyacrylates, copolymers of the alkaline metals of crosslinked vinyl alcohol acrylates, crosslinked starch acrylic graft polymers, hydrolyzates of crosslinked starch acrylonitrile graft polymers, acrylonitrile graft copolymers and others, in addition to sodium polyacrylate or the derivatives thereof. It is particularly desirable to apply this invention to human-waste disposal materials formed of sodium acrylate or the derivatives thereof.

Alkaline earth metal salts to be used in this invention include magnesium chloride, calcium chloride, magnesium sulfate, calcium carbonate, magnesium carbonate, calcium hydroxide, magnesium hydroxide and other water-soluble compounds, among which magnesium chloride and calcium chloride are more desirable, with calcium chloride being particularly desirable.

In this invention, the used human-waste disposal material containing a highly water-absorbent polymer that has absorbed the water content of the human waste is treated with an aqueous solution of an alkaline earth metal salt. The treatment can be performed with immersion processes, such as the batch immersion process, the continuous immersion process, or the spraying process. Among them, the batch immersion process is most suitable because the generation of waste water can be minimized.

The concentration of the aqueous solution of alkaline earth metal salt should preferably be more than 0.1 wt. % and less than a saturated concentration. To minimize the residual water content of the highly water-absorbent polymer after dehydrating, however, a concentration close to saturation is desirable. Although the treatment can be performed quite satisfactorily at normal temperatures, high temperatures over 40°-60° C. are more desirable. Prior to the treatment, the human-waste disposal material containing the highly water-absorbent polymer should preferably be crushed with a crusher, etc. In doing so, the external covering of the material, made of polyolefin film, can be separated and removed since it floats on the treatment solution, when crushed, due to its low specific gravity. To treat infectious bacteria as found in hospitals, a bactericide, such as glutaraldeahyde, should preferably be added to the aqueous solution of the alkaline earth metal salt. To treat offensive odor, the evolution of gases can be reduced by adding an inexpensive deodorant, such as wood vinegar.

The human-waste disposal material containing a highly water-absorbent polymer, after treatment with an aqueous solution of an alkaline earth metal salt to reduce water absorbency and eliminate swelling, is next subjected to mechanical dehydrating, such as centrifugal dehydration, pressurized dehydration, etc. With this treatment, the highly water-absorbent polymer yields its absorbed water, and as a result the water content of human-waste disposal material is drastically reduced.

The waste water generated from the dehydrating process can be treated satisfactorily with the normal sewage disposal process. Moreover, the residual solid waste after dehydration can be incinerated as is because of its low water content, or can be used as a fertilizer. It can be easily incinerated as part of normal combustible refuse. Since magnesium and calcium of the alkaline earth metal salt are trace elements essential to the growth of plants, organic matter in the residual solid waste after dehydration can be fermented in a bio-reactor to produce an organic fertilizer of very good quality.

As is apparent from the foregoing description, this invention makes it possible to deswell the used human-waste disposal material containing a highly water-absorbent polymer that has absorbed the water content of human waste by treating the material with an aqueous solution of a compound containing an alkaline earth metal salt to reduce the bonding between the highly water-absorbent polymer and the absorbed water. The treated human-waste disposal material can be further dehydrated easily for incineration, in an ordinary incinerator, or can be used effectively as a fertilizer.

EXAMPLE 1

High-molecular water-absorbing materials (20 g/piece) were extracted from three pieces of paper diapers of a grown-ups' panty type, manufactured by Procter & Gamble (brand name: "Attent"). This material is a high-molecular weight water-absorbing material estimated to be a sodium salt of the ethylene-oxide adduct of a polyacrylate, or a sodium salt of a propylene-oxide adduct of a polyacrylate. These pieces were packed in three bags knitted of 150-d polyester yarns (35 g/piece). 300 cc of water (25° C.) each was absorbed by these bags containing the high-molecular water-absorbing material. It had been confirmed beforehand that the water content of 300 cc cannot be removed with conventional dehydrating methods. The three bags each containing 300 cc of absorbed water were immersed in 500 cc of 0.1 wt. %, 1-wt. %, and saturated solutions (temperature: 40° C.) of magnesium chloride (manufactured by Kishida Chemical Co., Ltd.) for 30 minutes, and dehydrated for three minutes using the centrifugal dryer of a household washing machine (manufactured by Toshiba Corp., model: VH3060; 18-cm dia.) running at a speed of 3,400 rpm. The amount of water removed was measured to obtain % dehydration rate with respect to the total water volume of 300 cc. It was found that 70% dehydration was achieved with the 0.1-wt. % solution, 87% with the 1-wt. % solution, and the greatest dehydration of 92% with the saturated solution.

EXAMPLE 2

Three grown-ups' paper diapers manufactured by Haku-juji Co., Ltd. were used in this example (brand name: "New Hareyaka LL P" with high-molecular water-absorbing material). The high-molecular water-absorbing material is estimated to the same as that used in EXAMPLE 1. 300 cc of water was absorbed by each piece of paper diaper (average weight of paper diaper: 70 g/piece) at a water temperature of 25° C. The diapers were allowed to stand for 30 minutes to ensure full insoak of water, and then crushed with a small crusher (manufactured by Koyo Machinery Co., Ltd.). The revolution of the impact breaker of the crusher was set at 310 rpm.

Each of these test specimens was immersed in 300 cc of the 0.1-wt. %, 1-wt. %, and saturated solutions (temperature: 25° C.) of calcium chloride (manufactured by Kishida Chemical Co., Ltd.) for two hours, and then dehydrated by wringing them by hand. As a result, 60% dehydration rate was accomplished with the 0.1-wt. % solution, 80% with the 1-wt. % solution, and 82% with the saturated solution.

Unlike EXAMPLE 1 where only the high-molecular water-absorbing materials of paper diapers were tested, the use of whole paper diapers in EXAMPLE 2 allowed water to be absorbed not only by the high-molecular water-absorbing materials but also by the rayon non-woven fabric and cotton-like pulp materials of the diapers. This resulted in a reduced amount of removed water, compared with EXAMPLE 1. The polyolefin film used in the paper diapers, whose specific gravity is smaller than that of water, could be removed by decanting off the supernatant fluid containing suspended matter.

EXAMPLE 3

Used paper diapers (which included a wide variety of paper diapers manufactured by various manufacturers) collected from Tsubaki-en, a nursing home for the aged (address: Tsubaki 1059-1, Shirahama-cho, Nishimuro-gun, Wakayama Prefecture, Japan) were crushed, together with their polyethylene containers in a similar manner to EXAMPLE 2. Then, 400 g each samples were immersed in 2,000 cc of the 0.1-wt. %, 1-wt. %, and saturated solutions (temperature: 25° C.) of calcium chloride (manufactured by Nogiwa Shoten Co., Ltd.)

for 1 hour, and dehydrated for five minutes, using the centrifugal dryer of a household washing machine (manufactured by Toshiba Corp., model: VH3060, 18-cm dia.) running at a revolution of 3,400 rpm. As a result, 48% dehydration was accomplished with the 0.1-wt. % solution, 70% with the 1 wt. % solution, and 76% with the saturated solution.

What is claimed is:

1. A method for dehydrating a disposable, human-waste collecting article fabricated at least in part of a water-absorbent polymer having sodium carboxylate groups, the water-absorbent polymer containing water absorbed from human waste, said method comprising:
   contacting said disposable article with an aqueous solution of an alkaline earth metal salt to reduce the affinity between said water-absorbent polymer and said water; and
   then mechanically dehydrating said disposable article.

2. A method in accordance with claim 1, wherein said aqueous solution of an alkaline earth metal salt is a saturated aqueous solution of calcium chloride at a temperature above 40° C.

3. A method in accordance with claim 1, wherein said aqueous solution of an alkaline earth metal salt is a saturated aqueous solution of magnesium chloride at a temperature above 40° C.

4. A method in accordance with claim 1, further comprising crushing said disposable article prior to said contacting.

5. A method in accordance with claim 1, wherein said aqueous solution further contains a bactericide.

6. A method in accordance with claim 1, wherein said aqueous solution further contains a deodorant.

7. A method in accordance with claim 1, wherein said water-absorbent polymer is swollen by absorption of said water and is deswelled by said contacting.

8. A method in accordance with claim 1, wherein said contacting is by spraying or immersing.

9. A method in accordance with claim 8, wherein said dehydrating is centrifugal drying.

10. A method in accordance with claim 1, wherein said dehydrating is centrifugal drying.

* * * * *